United States Patent
Lechaton et al.

(10) Patent No.: US 8,360,006 B2
(45) Date of Patent: Jan. 29, 2013

(54) CAT LITTER BOX LINER WITH AN ABSORBENT SCRATCH RESISTANT PAD

(76) Inventors: John S. Lechaton, Englewood, FL (US); Marie Lechaton, Wappingers Falls, NY (US)

( * ) Notice: Subject to any disclaimer, the term of this patent is extended or adjusted under 35 U.S.C. 154(b) by 0 days.

(21) Appl. No.: 13/066,610

(22) Filed: Apr. 19, 2011

(65) Prior Publication Data

US 2012/0266825 A1  Oct. 25, 2012

(51) Int. Cl.
*A01K 29/00* (2006.01)
(52) U.S. Cl. .......... 119/161; 119/167; 119/166
(58) Field of Classification Search .......... 119/161, 119/167, 169, 166, 165, 170, 171, 172, 173
See application file for complete search history.

(56) References Cited

U.S. PATENT DOCUMENTS

| | | | | |
|---|---|---|---|---|
| 3,698,360 A | * | 10/1972 | Rubricius | 119/458 |
| 4,779,566 A | * | 10/1988 | Morris et al. | 119/165 |
| 4,807,564 A | * | 2/1989 | Soberg et al. | 119/169 |
| 5,007,375 A | * | 4/1991 | Paciullo | 119/170 |
| 5,062,392 A | * | 11/1991 | Lavash | 119/167 |
| 5,488,929 A | | 2/1996 | Pierson et al. | |
| 5,577,466 A | * | 11/1996 | Luxford | 119/706 |
| 5,819,688 A | * | 10/1998 | Walker | 119/169 |
| 6,112,698 A | * | 9/2000 | Zelinger | 119/61.54 |
| 6,394,039 B1 | * | 5/2002 | Grauer | 119/712 |
| 6,397,778 B1 | * | 6/2002 | Tripp | 119/28.5 |
| 6,926,862 B2 | | 8/2005 | Fontenot et al. | |
| 7,128,023 B2 | * | 10/2006 | Otsuji et al. | 119/169 |
| 7,654,227 B1 | * | 2/2010 | Yananton | 119/169 |
| 7,726,260 B1 | * | 6/2010 | Yananton | 119/171 |
| 8,152,902 B2 | * | 4/2012 | Wood et al. | 95/144 |

\* cited by examiner

*Primary Examiner* — Yvonne Abbott

(74) *Attorney, Agent, or Firm* — Saile Ackerman LLC; Stephen B. Ackerman

(57) ABSTRACT

A first embodiment of this invention is a cat litter bag composed of a thin plastic bag having a scratch resistant surface on the upper surface to avoid being damaged when used by cats. The scratch resistant material also serves to absorb cat urine to minimize odor during use. By a second embodiment the cat litter bag is shown filled with clean litter for convenience and travel.

8 Claims, 2 Drawing Sheets

CAT LITTER BOX LINER WITH AN ABSORBENT SCRATCH RESISTANT PAD

BACKGROUND OF THE INVENTION (1) Field of the Invention

This invention provides a novel liner for a cat litter box. The liner is composed of a plastic liner with an absorbent scratch resistant layer that prevents the cat from damaging the plastic liner while the absorbent properties of the scratch resistant layer minimizes odor during usage. The plastic liner and scratch resistant pad are also biodegradable and therefore, eco-friendly during waste disposal. In a second embodiment, clean litter is packaged with each individual liner to minimize waste and reduce dust.

(2) Description of the Prior Art

Litter boxes with plastic liners are used extensively in homes for cats. Many times when the cat digs a hole and then covers his or her waste (stool, urine), the cat claws get caught in the plastic liner. This can result in the litter being ejected from the litter box which results in a mess that the owner needs to clean-up. Also clawing of the plastic liner can result in openings in, the liner in which urine can seep between the liner and the litter box making it difficult to clean and after a time and results in an odor from the evaporating urine which is annoying and may be unhealthy. Another problem that may occur if the litter box is near a plaster wall, the cat may claw and damage the wall in an effort to cover the stool.

Various liners for litter boxes have been invented and reported in the literature. For example, in U.S. Pat. No. 5,007,375 a litter box envelope is described. In this invention a litter box envelope is described in which the litter box is inserted. This litter box envelope has a top surface that is scratch proof formed from a nylon type surface. Although, tear resistant, it is nonabsorbent, expensive or time consuming to clean.

In another U.S. Pat. No. 6,926,862 B2 a container, shelves and drawer liners providing absorbance and odor control is described. This invention is used mainly in refrigerators and trash cans to absorb spills and eliminate odors. The invention describes briefly the use in trash can for disposing of cat litter, but does not describe explicit use of the technique in litter boxes. Also the invention is silent about using it as a scratch resistant layer in a litter box.

In U.S. Pat. No. 5,488,929 a disposable cat litter box liner is described. In this invention the litter liner is a box that is fabricated by folding into a cardboard box for filling with litter for the cat.

Therefore, there is still a strong need in the consumer market for an improved liner for conventional cat litter boxes. A liner which as a scratch resistant surface and is absorbent to minimizes odor and makes it easy to clean a conventional litter box.

SUMMARY OF THE INVENTION

A principal object of this present invention is to provide a plastic litter box liner with a absorbent upper surface layer that is sufficiently thick and smooth to resist being damaged by scratching and also absorbent to minimize odor from the cat urine.

A second object of this invention is to replace a relatively thick plastic liner with more cost effective thinner plastic liner and a liner that is a more bio-degradable plastic material, also referred to as bio-plastic.

A third object of this invention by a second embodiment is to include clean litter in each cat litter liner to reduce work and minimize dust, and for convenient while traveling with a cat.

In accordance with the objects of the present invention a cat litter bag is formed from a plastic bag with a scratch resistant layer formed on the inner surface, so that when the bag is placed on and in a litter box the scratch resistant layer is exposed on the top surface. The plastic bag is preferably composed of a bio degradable plastic and the scratch resistant layer is composed of a durable material, such as a durable paper. In a second embodiment of this novel cat litter liner, the liner is packaged with clean cat litter for easy dispensing, for example, when traveling with cats.

DESCRIPTION OF THE PREFERRED EMBODIMENTS

In accordance with the present invention the novel cat litter liner is described in more details.

Figure 1:
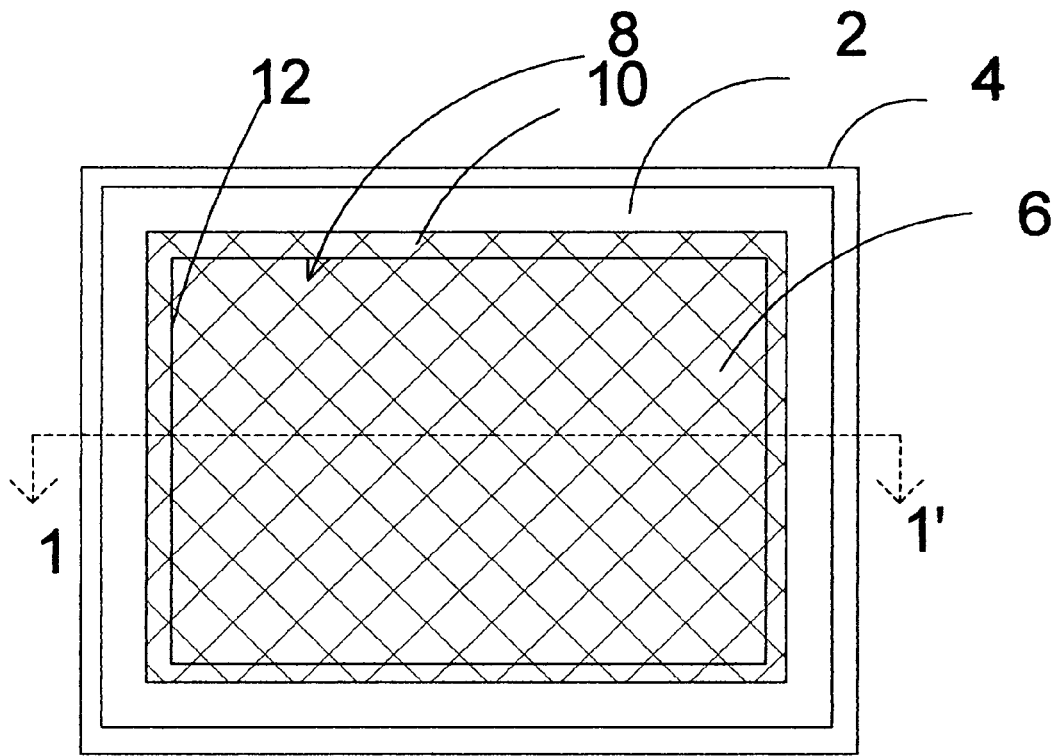
FIG. 1 shows a schematic top view of a litter box with a plastic liner and a scratch pad on the top surface.

Referring first to FIG. 1, a top view is shown of a cat litter box 2 with a plastid liner 4. The scratch resistant layer 6 is bonded to the top surface of the plastic liner 4 using a bio-degradable adhesive.

Figure 2:
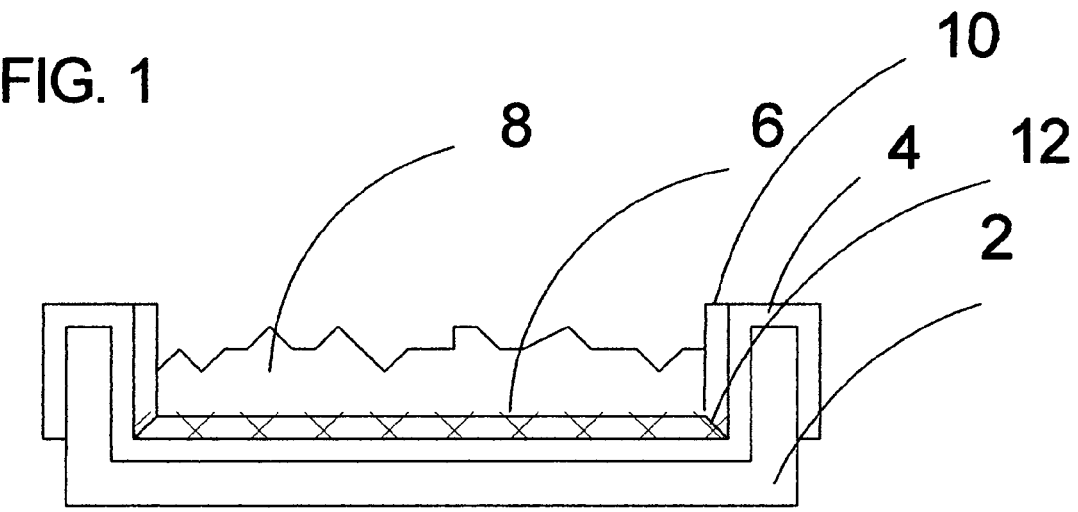
FIG. 2 shows a schematic cross-sectional view 1-1' through the cat litter box in FIG. 1.

In FIG. 2 a schematic cross-sectional side view is shown for the cross section through 1-1' of FIG. 1. The plastic liner 4 is composed of a thin plastic to minimize waste disposal. Although all plastics are bio-degradable, a bio-plastic which decomposes more rapidly is desirable to reduce waste. For example, the bio-plastic can be selected from a group that includes starch-based plastics, polylactide acid (PLA) plastics, hydride resins, Poly-3-hydroxybutyrate (PHB), polyamide 11 (PA11) and the like. The scratch resistant pad 6 is preferably composed of a heavy gauged paper. For example, the paper can be a butcher paper, paper used for grocery bags and the like. More specifically, the paper is formed by chemical means, as known in the art, to remove the lignin and form a stronger paper that is more scratch resistant. More specifically, the wood pulp can be treated with various salts of sulfurous acid to extract the lignin from the wood pulp to form an almost cellulose fiber.

Also shown in FIG. 2 the scratch Resistant pad is design to extend up the side 10 of the litter box 2 to further protect the underlying plastic liner 4 during use by the cat. For example, the scratch resistant pad can be creased along the edge 12 to more easily fit a liner in the cat box. Also not shown, a tie string can be included to help seal the bag during disposal.

Figure 3:
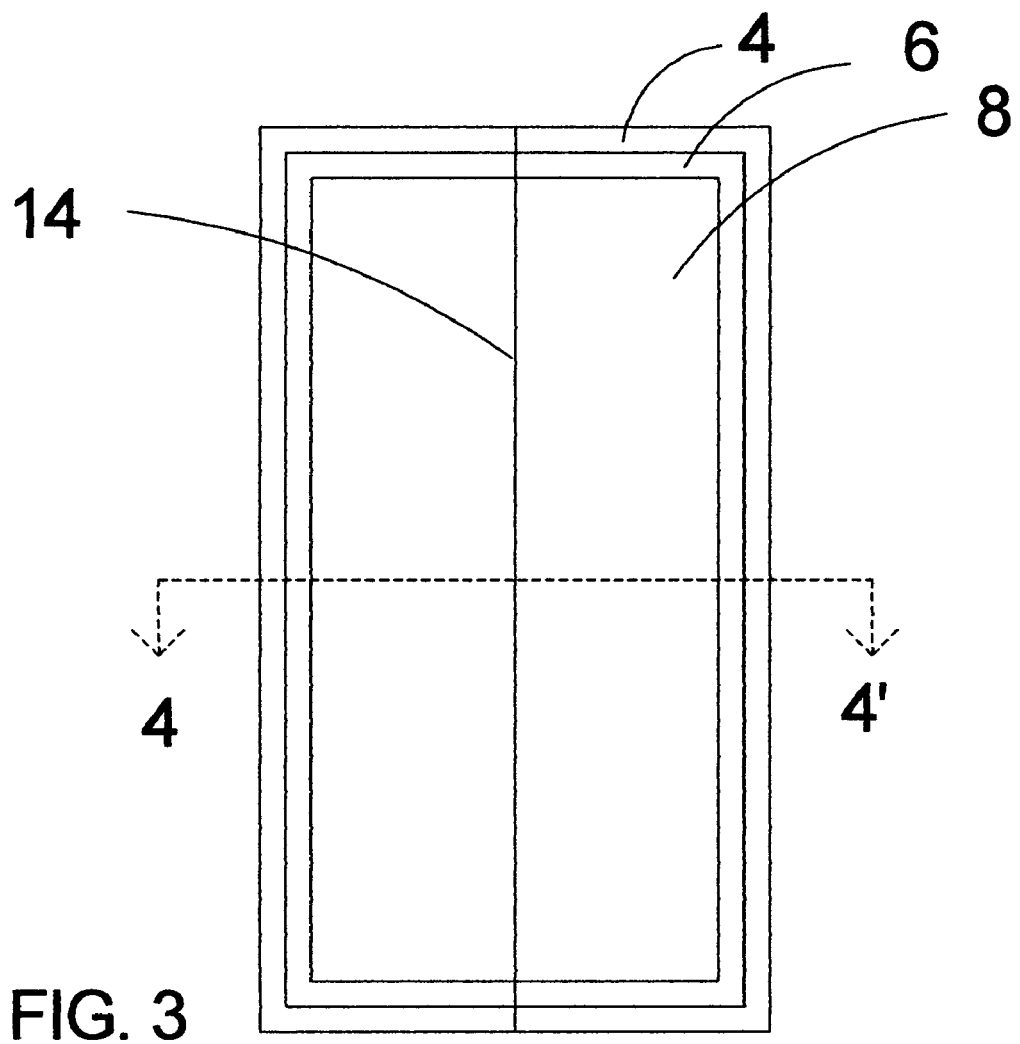
FIG. 3 shows a schematic top view of a cat litter liner rolled up (packaged) and including clean cat litter by the second embodiment.
Figure 4:
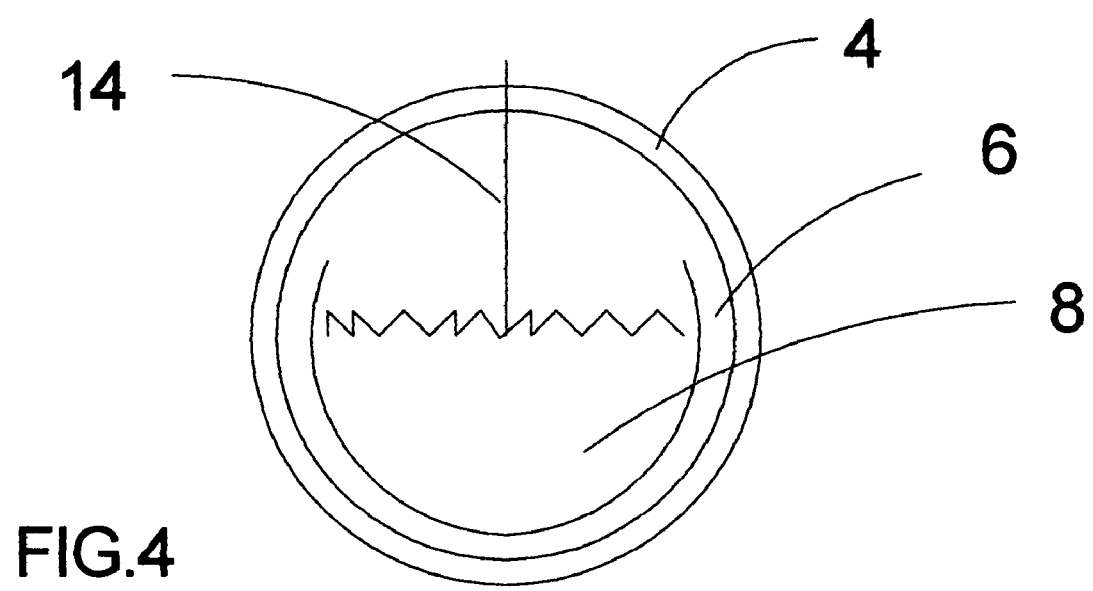
FIG. 4 shows a schematic cross sectional view 3-3' of a cat litter liner in FIG. 3.

Referring to FIG. 3 and FIG. 4, a top view and a cross-sectional schematic view, respectively, are shown for a second embodiment. In this embodiment is shown one method of pre-packaging clean cat litter in this improved cat litter bag. This prepackaged cat litter bag is desirable when traveling away from home.

While the design of the cat litter liner is shown for a rectangular shaped litter box it should be understood that this novel liner can take on other shapes that conform to cat litter boxes of varying shapes. For example, the liner can take on various shapes such as, squarer, round, and the like, without deviating from the spirit of the invention.

What is claimed is:

1. A cat litter liner comprising:
   a plastic sheet having a scratch resistant layer over said plastic sheet;
   wherein said scratch resistant layer also serves as an absorption layer, and said scratch resistant layer is formed by a chemical process to remove the lignin and form a strong scratch resistant paper;
   wherein said cat litter liner is placed over a cat litter box wherein said scratch resistant layer is exposed on the top surface for receiving cat litter.

2. The cat litter liner of claim 1, wherein said plastic sheet is formed of a bio plastic, wherein the bioplastic is starch based plastics, Polylactic acid (PLA), Poly-3-hydroxybutyrate. (PBH), Polyamide 11 (PA 11), or Bio-derived polyethylene.

3. The cat litter liner of claim 1, wherein said scratch resistant layer comprises cellulose pulp derived from wood rag or grasses.

4. The cat litter liner of claim 1, wherein said scratch resistant pad is attached to the top surface of said plastic liner.

5. A method of fabricating a scratch resistant absorbing cat litter liner comprising of:
   forming a plastic liner bag comprising a plastic sheet and a scratch resistant layer on the inner surface of said plastic sheet;
   wherein said scratch resistant layer also serving as an absorption layer, and said scratch resistant layer is formed by a chemical process to remove the lignin and form a strong scratch resistant paper;
   wherein said plastic liner bag is placed over a cat litter box, wherein said scratch resistant layer is exposed on the top surface for receiving cat litter.

6. The method of claim 5, wherein said plastic sheet is formed from bioplastic, wherein said bioplastic is starch based plastics, Polylactic acid (PLA), Poly-3-hydroxybutyrate (PBH), Polyamide 11 (PA 11), or Bio-derived polyethylene.

7. The method of claim 6, wherein said scratch resistant layer is cellulose pulp derived from wood rag or grasses.

8. The method of claim 6, wherein said scratch resistant pad is attached to the top surface of said plastic liner.

* * * * *